July 18, 1950 G. L. USSELMAN 2,515,677

DIRECT CURRENT LIMITER AND COUNTER CIRCUIT

Filed May 23, 1947

INVENTOR.

George L. Usselman

BY Larry Tunick

ATTORNEY

Patented July 18, 1950 2,515,677

UNITED STATES PATENT OFFICE 2,515,677

DIRECT CURRENT LIMITER AND COUNTER CIRCUIT

George L. Usselman, Port Jefferson, N. Y., assignor to Radio Corporation of America, a corporation of Delaware Application May 23, 1947, Serial No. 750,109

8 Claims. (Cl. 235—92)

The present invention relates to power supply systems, and more particularly to protective arrangements for power supplies wherein a diode limiter is used between said power supply and a load such as a radio transmitter.

It has previously been known to use a diode tube in series between an anode direct current supply source and a radio transmitter or vacuum tube amplifier stage in order to protect the amplifier stage and the power supply from the damaging effects of short circuits or arc-overs in the amplifier stage. Such arc-overs are generally of short duration, ordinarily lasting only for time periods of a few microseconds. For this reason conventional circuit breakers are not fast enough to be fully effective in preventing damage to the apparatus from the resultant large current flow. However, a current limiting diode between the power supply and the transmitter or amplifier is effective in instantaneously limiting the flow of anode current to that value of emission current which the diode is capable of supplying. It is desirable to keep a record of the number of limiting actions which the diode is called upon to perform. It is also considered desirable to be able to differentiate between fast arc-overs that do not affect the normal overload relays because they are taken care of by the limiting action of the diode and normal overload trip-outs of the circuit breakers. These factors may be taken care of by installing a counter circuit as described hereinafter in connection with the diode limiter. Furtherfore, ordinary electrically operated counters may be connected to the transmitter plate current overload relays. At any time, by comparing the readings of these two counters, the number of short circuits or arc-overs taken care of by the diode limiter and regular circuit breaker respectively may be determined.

An object of the present invention, therefore, is the provision of a reliable arrangement for registering the operation of power supply protective arrangements for radio transmitters.

Another object of the present invention is the provision of a novel and simplified counter arrangement.

Still another object of the present invention is the provision of an arrangement for amplifying and lengthening direct current pulses.

Still a further object of the present invention is to amplify, lengthen and register pulses such as those generated as a consequence of faulty operation of a radio transmitter.

The foregoing objects and others which may appear from the following detailed description are attained by connecting in series between the anode power supply of a radio transmitter and the transmitter itself a current limiting diode. Arc-overs or short duration short circuits in the transmitter which would ordinarily cause extremely heavy currents to be drawn from the power supply then may draw only so much current as permitted by the emission limit of the diode. Thus, the maximum current which may be drawn may, for example, be held to a value not greater than about two times the normal current drain. Under such conditions about 85% of the power supply voltage appears across the current limiting diode itself. This appears as a pulse of about 1 to 5 microseconds duration across the diode terminals. Amplifying and pulse lengthening means are provided so that an ordinary mechanical counter may be actuated by the pulse. Each of the pulses appearing across the diode operates to quickly charge a comparatively large condenser which may then be discharged at a lower rate, thus in effect providing an elongated pulse having characteristics such that it will operate a conventional mechanical counter.

The present invention will be more fully understood by reference to the following detailed description which is accompanied by a drawing in which:

Figure 1 illustrates a simplified embodiment of the present invention, while

Figure 1:
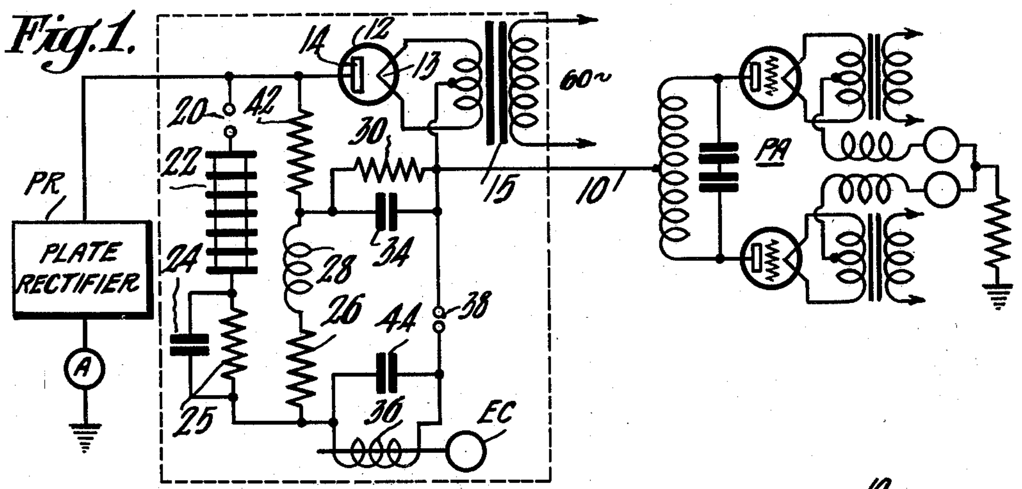

Referring now to Figure 1, there is shown a radio transmitter anode power supply PR connected by conductor 10 to a transmitter power amplifier PA. The power supply PR is represented by a box and the transmitter power amplifier by a simplified schematic diagram. Since the details of these two elements are not considered to be a part of the present invention, it is not, therefore, believed necessary to describe their construction in detail. Conductor 10 between the power supply PR and amplifier PA has, inserted in series therewith, a current limiting diode 12 having an anode 14 and a cathode 13. The cathode 13 is heated by a filament supply transformer 15 having its primary connected as indicated by the arrows to a conventional source of alternating power supply. Connected across the terminals of the current limiting diode 12 is a circuit including a first spark gap 20, a resistor 22 having a negative resistance-voltage characteristic, condenser 24, counter actuating winding 36 and a second spark gap 38. Resistor 22 is made of a material marketed under the name "Thyrite." It should be noted that while for the convenience of description I have referred to spark gaps 20 and 38, in practice an evacuated gaseous discharge gap may be used if desired. Now, if a momentary short circuit should appear in the power amplifier PA, the current drawn thereby will be limited by the emission limit of the diode filament 13. The voltage drop across the current limiting diode 12 increases to such an extent that spark gap 20 breaks down. Spark gap 20 is preferably adjusted so as to spark over at about 75% of the total rectifier voltage supplied by power supply PR. The breakdown of spark gaps 20 and 38 causes current to flow through resistors 22 and 25. Due to the negative voltage-resistance characteristic of resistor 22, shortly after gap 20 breaks down, the voltage distribution through the series circuit is so altered that the spark discharge across gap 20 is extinguished. At the beginning of the spark a large current rushes across gap 20 and charges up condenser 24. This current then diminishes as the condenser is charged so that only the current through resistance 25 flows. During the first part of the spark, while the current is high, the Thyrite resistance is low. But, after the condenser is charged the current in the gap circuit is low and the Thyrite resistance is high. This produces a squelching action in which the Thyrite resistance reaches almost infinity. When a spark discharge across a gap is extinguished, the gap resistance is substantially infinity for normal operating voltages. Only another high voltage surge or pulse will initiate another spark through gaps 20 and 38. The voltage drop which first existed across resistor 25 caused a charge to be stored in condenser 24. This initial surge of current which charges condenser 24 is too short and too deficient in power or energy to operate the counter EC directly. Spark gap 38 is broken down by the initial surge an instant after gap 20, to enable charging of condenser 24 to be accomplished very rapidly. When gap 38 thus breaks down, condenser 34, which is normally charged, discharges through a series circuit including inductance 28, resistor 26, actuating coil 36 of the electrical counter EC, and the series gap 38. The discharge of condenser 34 through the counter actuating coil 36 is long enough in duration to effectively actuate the counter EC. Thereafter, the breakdown of spark gap 38 ceases. The spark across gap 38 continues after that across gap 20 has been extinguished, due to the discharge of condenser 34. By the time the counter has operated gap 38 is extinguished due to the exhaustion of the charge in condenser 34 and due to the inductance in the circuit which causes the discharge voltage and current to pass through zero. The spark goes out as the voltage and current go to zero. Condenser 34 during normal operation attains its operating charge through a circuit which may be traced from anode 14 of the diode 12 through resistor 42, condenser 34 and the center tap of the secondary winding of filament transformer 15. Resistor 30 acts together with resistor 42 as a voltage divider or potentiometer across condenser 34 to prevent the voltage thereacross from becoming too high. Resistor 30 may, if desired, be a Thyrite resistor having characteristics similar to those mentioned above with respect to resistor 22. Condenser 34 is large in size, a value of around 100 mf. having been found satisfactory. There are two reasons why condenser 34 should be large in size; first, in order to store sufficient energy to operate the electric counter EC, and second, to increase the length of the pulse passing through coil 36 to allow sufficient time for the counter EC to operate. The inductance 28 and resistor 26 help to increase the pulse length. In order to prevent high voltages across gap 20 from endangering the coil insulation of coil 36, a further condenser 44 may be shunted across coil 36. The inductance 28 and the resistor 26 also prevent the surge of charging current from gap 20 and condenser 24 from entering condenser 34 and thus evading spark gap 38. Consequently, the initial surge current from condenser 24 is forced to spark across gap 38. The charge current from condenser 34 then follows. The original surge of charge current of condenser 24 is too short and lacking in power to operate the counter EC directly but the discharge of current from the condenser 34 is of ample magnitude to operate the counter. The limiter tube is used primarily to protect the power amplifier. The destructive current comes from the charge stored up in the rectifier smoothing condenser. Of course, the rectifier is also incidentally protected. If too much current is by-passed around the limiter tube, its main purpose would be largely defeated.

Figure 2:
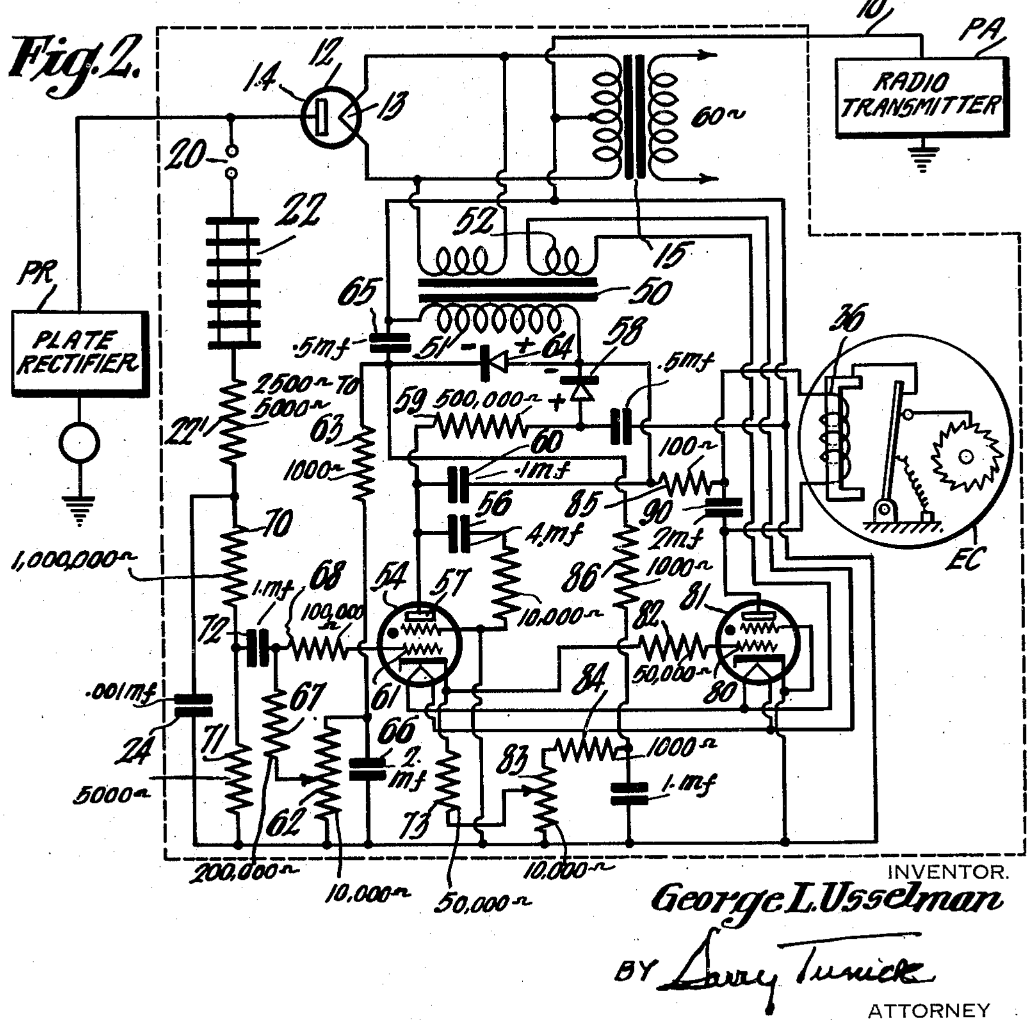
Figure 2 illustrates a modified form of the invention.

In Figure 2 there is shown a modified form of the present invention. In this figure the power supply PR, the current limiting diode 12 and the transmitter PA are the same as described with reference to Figure 1. This is also true of the arrangement for energizing filament 13 of the diode. However, the secondary of transformer 15 is in this modification connected to a winding on a further transformer 50 having a winding 51 for supplying anode power and a winding 52 for supplying heater power to gas discharge tubes 54 and 81. By thus arranging transformer 50, it is unnecessary to provide a great deal of insulation between the windings of this transformer, only transformer 15 being subject to a high potential difference between the primary and secondary windings. The circuit of tube 54 is a biased relaxation oscillator arrangement, the condenser 56 connected to anode 57 of tube 54 being arranged to be charged from winding 51 of transformer 50 through a rectifier 58 and series resistor 59. Grid 61 of tube 54 is biased to cut off by a suitable negative potential the magnitude of which may be adjusted by varying the tap on potentiometer 62. Potentiometer 62 with resistor 63 forms a voltage divider circuit connected to the output rectifier 64. Condensers 65 and 66 serves to smooth the direct current potential across potentiometer 62. Condenser 65 also serves to increase the voltage of rectifier 64. It is quite well-known to those skilled in the art that a condenser placed in a rectifying circuit to shunt a resistance load will increase the average voltage across the load. The average voltage across a resistance load is proportional to the average current flowing through it. In the case of rectifier 64 and load resistor 63, without condenser 65 the rectified current flows in rather short pulses, giving a low average voltage across load 63. When condenser 65 is added in shunt with resistor 63, as described, it is charged with comparatively heavy current pulses by rectifier 64. Consequently, a much larger average direct current flows through load resistor 63, producing a higher average direct voltage, which is desired. The variable tap of potentiometer 62 is connected to the grid 61 of tube 54 by way of grid leak 67 and a grid series resistor 68. During normal operation the dry contact rectifier 58 serves to charge up condenser 56 through resistor 59 since tube 54 is biased to cut off, as mentioned before. The charging time of condenser 56 through resistor 59 is preferably of the order of two or three seconds.

The limiting action of tube 12 causes spark gap 20 to spark over when it is set at about 75% of the power supply voltage as described above with reference to Figure 1. Then, the condenser 24 is charged but the resistor 22′ limits the instantaneous rush of current to a desired value depending upon the resistance value of the resistor. When condenser 24 is fully charged the resistor 22, the Thyrite, quenches the spark in gap 20. Then, the charge in condenser 24 is discharged through a series path including resistances 70 and 71. The part of the potential pulse developed across resistor 71 is applied through condenser 72 to the control grid 61 of tube 54. This overcomes the cutoff bias on grid 61 and causes tube 54 to discharge condenser 56 through the tube. Condenser 56 is normally charged from the source through rectifier 58 and resistor 59, and the 10,000 ohm resistor, which together form an RC time constant circuit. Condenser 56 is connected directly to the anode 57 of tube 54, while the lower end of the 10,000 ohm resistor is connected to the cathode of said tube through resistors 83 and 73. When tube 54 ionizes, condenser 56 discharges across the anode-cathode path of said tube through the 10,000 ohm resistor and resistors 83 and 73. The condenser 56 does not discharge between the anode and the screen grid of tube 54. In order for this to occur, the screen grid would have to emit electrons, which it does not do. The voltage drop across cathode resistor 73 and resistor 83, developed as a consequence of the discharge current from condenser 56 flowing therethrough, is applied to the control grid 80 of tube 81 through a series current limiting resistor 82. This pulse is of sufficient potential to trip tube 81 and to cause it to conduct by overcoming the cut-off bias applied to grid 80 by means of a selected amount of the negative bias voltage appearing across the series circuit including potentiometer 83 and resistors 84 and 86. Potentiometer 83 also supplies a fixed but adjustable bias for the cathode of tube 54, enabling adjustment of the breakdown or firing voltage of said tube. The discharge of condenser 56 through tube 54 gives a positive pulse to the grid 80 of tube 81 having a duration of about one third of a second. The amount of charge in condenser 56 and the value of resistors 73 and 83 and the 10,000 ohm resistor determine how long tube 81 will conduct, while the values of condenser 56 and said resistors determine to a large extent the length or time duration of the current pulse through tube 54. The size of resistor 73 and the setting of potentiometer 83 determine the value of the voltage pulse delivered to the control grid of gas tube 81 through the resistor 82. Tube 81 is supplied with alternating current anode potential from the winding 51 of transformer 50 through a series circuit including resistor 85 and condenser 90. Thus, when tube 81 is caused to conduct from 20 cycles to 60 cycles of current from winding 51 it is rectified and caused to flow through the electric counter actuating coil 36. This is sufficient to cause the counter to function for one limiting action. Since only A. C. potential is supplied to the anode of tube 81, as soon as the pulse applied to grid 81 is dissipated the grid bias again becomes sufficiently negative and plate current is again cut off. Tube 54 is assisted in ceasing its discharge after the charge has nearly all flowed out of condenser 56 by a small amount of alternating current potential applied to the anode 57 by condenser 60. Condenser 90 is provided for the purpose of passing the A. C. component of current drawn by tube 81 around the counter coil 36, thus allowing only the direct current component to pass through the coil.

It should be noted that the entire circuit within the dotted line is in effect directly connected to the direct current anode supply lead 10 for the transmitter PA. Therefore, caution must be taken that all of the structural elements within the dotted line are insulated from ground for the full amount of the output voltage of the power supply PR. These structural elements must be enclosed to prevent personal contact therewith during the time of operation.

While I have illustrated a particular embodiment of the present invention, it should be clearly understood that it is not limited thereto since many modifications may be made in the several elements employed and in their arrangement and it is therefore contemplated by the appended claims to cover any such modifications as fall within the spirit and scope of the invention.

What is claimed is:

1. A circuit arrangement including a series protective device across which appear high potential pulses of short duration when short circuit currents flow through said device, at least one series spark gap coupled to said device, and adapted to break down when said pulses appear, and a condenser adapted to be charged by current flowing through said gap, a second normally charged condenser, a counter having an actuating coil coupled to said second condenser, and switching means connected in series with said first and second condensers and responsive to the appearance of said pulses to permit charging of said first condenser and thereby also to permit a discharge of said second condenser through said actuating coil to operate said counter.

2. A circuit arrangement including a series protective device across which appear high potential pulses of short duration when short circuit currents flow through said device, a circuit including at least one series spark gap coupled to said device and adapted to break down when said pulses appear, and a condenser adapted to be charged by current flowing through said gap, a resistor element connected in series with said gap and having a negative resistance-voltage characteristic, a second normally charged condenser, a counter having an actuating coil coupled to said second condenser, and switching means connected in series with said first and second condensers and responsive to the appearance of said pulses to permit charging of said first condenser and thereby also to permit a discharge of said second condenser through said actuating coil to operate said counter.

3. A circuit arrangement including a series protective device across which appear high potential pulses of short duration when short circuit currents flow through said device, a circuit including at least one series spark gap coupled to said device and adapted to break down when said pulses appear, and a condenser adapted to be charged by current flowing through said gap, a second series gap and an actuating coil for a counter also connected in said circuit, a second condenser connected across said second gap and actuating coil, and means for charging said second condenser, said second gap breaking down in response to the appearance of said pulses to permit charging of said first condenser and to permit discharging of said second condenser through said actuating coil to operate said counter.

4. A circuit arrangement including a series protective device across which appear high potential pulses of short duration when short circuit currents flow through said device, a circuit including at least one series spark gap coupled to said device and adapted to break down when said pulses appear, and a condenser adapted to be charged by current flowing through said gap, a second series gap and an actuating coil for a counter also connected in said circuit, a second condenser connected across said second gap and actuating coil, means for charging said second condenser, said second gap breaking down in response to the appearance of said pulses to permit charging of said first condenser and to permit discharging of said second condenser through said actuating coil to operate said counter, and a resistor element in said circuit adapted to extinguish the breakdown of said first gap, said resistor element having a negative voltage-resistance characteristic.

5. A circuit arrangement including a series protective device across which appear high potential pulses of short duration when short circuit currents flow through said device, a circuit including at least one series spark gap coupled to said device, and adapted to break down when said pulses appear, and a condenser adapted to be charged by current flowing through said gap, a second series gap and an actuating coil for a counter also connected in said circuit, a second condenser connected across said second gap and actuating coil, means for charging said second condenser, said second gap breaking down in response to the appearance of said pulses to permit charging of said first condenser and to permit discharging of said second condenser through said actuating coil to operate said counter, and an inductance in series with said second condenser for increasing the time duration of current flow from said second condenser.

6. A circuit arrangement including a series protective device across which appear high potential pulses of short duration when short circuit currents flow through said device, a circuit including at least one series spark gap coupled to said device, and adapted to break down when said pulses appear, and a condenser adapted to be charged by current flowing through said gap, a second series gap and an actuating coil for a counter also connected in said circuit, a second condenser connected across said second gap and actuating coil, means for charging said second condenser, said second gap breaking down in response to the appearance of said pulses to permit charging of said first condenser and to permit discharging of said second condenser through said actuating coil to operate said counter, a resistor element in said circuit adapted to extinguish the break down of said first gap, said resistor element having a negative voltage-resistance characteristic, and an inductance in series with said second condenser for increasing the time duration of current flow from said second condenser.

7. A power supply arrangement comprising a source of direct potential for electron discharge devices, a connection from said source to said devices, a series connected diode in said connection for limiting the current drawn by said devices from said source to a value determined by the emission capabilities of the cathode of said diode, and a counter circuit connected across the terminals of said diode, said circuit being responsive to an increase, above a predetermined value, of the potential drop across said diode, said counter circuit including a spark gap adapted to break down at said predetermined value, a condenser charged by the flow of current across said gap, a counter having an actuating coil, means for discharging said condenser, means responsive to the discharge of said condenser for generating an elongated pulse of electrical energy, and connections for applying said pulse to said actuating coil to actuate said counter.

8. A power supply arrangement comprising a source of direct potential for electron discharge devices, a connection from said source to said devices, a series connected diode in said connection for limiting the power current drawn by said devices from said source to a value determined by the emission capabilities of the cathode of said diode, and a counter circuit connected across the terminals of said diode, said circuit being responsive to an increase, above a predetermined value, of the potential drop across said diode, said counter circuit including a normally charged condenser, a normally blocked first gas discharge tube connected to discharge said condenser when said tube conducts, means responsive to said increase in potential drop for causing said tube to conduct, a second gas discharge tube having an anode circuit including the actuating coil of a counter, and connections from said first tube to a control electrode of said second tube, whereby discharge of said condenser through said first tube causes said second tube to pass current through said actuating coil to actuate said counter.

GEORGE L. USSELMAN.

REFERENCES CITED

The following references are of record in the file of this patent:

UNITED STATES PATENTS

| Number | Name | Date |
|---|---|---|
| 1,549,456 | Creighton | Aug. 11, 1925 |
| 1,869,466 | Cole | Aug. 2, 1932 |
| 2,014,179 | Honaman | Sept. 10, 1935 |
| 2,124,410 | Cockrell | July 19, 1938 |
| 2,200,233 | Whitehead | May 7, 1940 |
| 2,326,313 | Trucksess | Aug. 10, 1943 |
| 2,367,329 | Berger | Jan. 16, 1945 |
| 2,377,622 | Finzi | June 5, 1945 |
| 2,405,121 | Fehr | Aug. 6, 1946 |
| 2,473,344 | McCown | June 14, 1949 |

OTHER REFERENCES

Lord & Livingston: An Electronic Multiplier for High Speed Counting, Electronics, January, 1934.